United States Patent [19]

Worley

[11] 4,325,916
[45] Apr. 20, 1982

[54] REFORMER FURNACE SEAL

[75] Inventor: Arthur C. Worley, Mt. Tabor, N.J.

[73] Assignee: Exxon Research & Engineering Co., Florham Park, N.J.

[21] Appl. No.: 108,409

[22] Filed: Dec. 31, 1979

[51] Int. Cl.³ .......................... B01J 8/06; B01J 19/02; F27D 1/16
[52] U.S. Cl. ..................................... 422/197; 264/30; 264/261; 422/204
[58] Field of Search ............... 422/190, 197, 204, 211, 422/240; 277/DIG. 6; 264/261, 262, 30

[56] References Cited

U.S. PATENT DOCUMENTS

| 2,987,382 | 6/1961 | Endter et al. | |
|---|---|---|---|
| 3,030,092 | 4/1962 | Hildenbrand | |
| 3,406,804 | 10/1968 | Breckenridge | |
| 3,414,052 | 12/1968 | Chojnowski et al. | |
| 3,453,087 | 7/1969 | Herp et al. | 422/197 |
| 3,471,178 | 10/1969 | Roe | 264/261 |
| 3,475,135 | 10/1969 | Gargomwy | |
| 3,607,130 | 9/1971 | Worley et al. | |
| 3,617,227 | 11/1971 | Beggs | |
| 3,838,536 | 10/1974 | McCoy | |
| 4,175,779 | 11/1979 | Apblett | 422/197 |

Primary Examiner—Bradley Garris
Attorney, Agent, or Firm—Robert S. Salzman

[57] ABSTRACT

A hydrocarbon reformer furnace is provided having a plurality of vertical tubes running through a furnace firebox wherein the upper and lower ends of said tubes are connected to inlet and outlet headers respectively. The apertures through which the lower ends of the vertical tubes exit the firebox are sealed with cast-in-place refractory seals to provide an air seal and mechanical dampening of said tubes.

1 Claim, 4 Drawing Figures

REFORMER FURNACE SEAL

BACKGROUND OF THE INVENTION

This invention pertains generally to steam reformer furnaces. More particularly, the invention is directed to such a steam reformer furnace wherein the steam reforming of hydrocarbons is conducted in a plurality of vertically oriented tubes which pass through the firebox of the furnace. The tubes are connected at their top to an inlet header and at their bottom to an outlet header. The aperture, through which each tube exits the firebox, is partially closed off by sliding steel base plates. A cast refractory seal is formed around the tube at the point of said base plates.

Reforming furnaces are well known in the prior art. However, these prior art steam furnaces have several drawbacks, including: (a) air leakage of the furnace firebox with the attendant loss of furnace energy efficiency, (b) the detrimental spacing tolerance between the vertical tubes of the furnace and the outlet aperture of the firebox with the attendant room for vibration of the tubes during operation of the furnace, (c) the failure to provide for the thermal expansion of the vertical pipes and the outlet header with respect to the outlet apertures, and (d) the serviceability of prior art seals at such outlets from the firebox.

In U.S. Pat. No. 3,607,130 to Worley et al. which is assigned to the assignee of this invention, a steam reformer furnace is described which provides a header and tube assembly specifically directed to some of the problems mentioned above. Particularly, Worley et al. provide a flexible upper mounting for the vertical tubes, as well as a flexible inlet connection to the tubes from the upper header. However, as shown in FIG. 2, the patent is not directed to an outlet seal for the vertical tubes.

U.S. Pat. No. 3,414,052 to Chojnowski et al. teaches the use of a compressible refractory packing for the seal of a heat exchange tube at the passage through the wall of a recuperative heat exchanger. The use of such a packing does not lend itself to readily being recast during maintenance operations, nor does the compressive feature of the heat exchanger seal provide sufficient damping for the seals in a reformer furnace seal. U.S. Pat. No. 3,475,135 to Gargominy describes a reformer furnace wherein the seal of the vertical tube and the floor of the furnace firebox is provided by means of a plurality of pellets of particulate fireproof material and a rigid bar of the same fireproof material. The former fails to prevent the loss of heated gases, while the latter does not solve the tolerance or vibration dampening problems of reformer furnaces.

Other prior art teachings of furnace seals of general interest include U.S. Pat. No. 2,987,382, Endter et al.; U.S. Pat. No. 3,030,092, Hildenbrand; U.S. Pat. No. 3,406,804, Breckenridge; U.S. Pat. No. 3,617,227, Beggs and U.S. Pat. No. 3,838,536, McCoy.

SUMMARY OF THE INVENTION

With a realization of the problems in reformer furnaces as they presently exist and an understanding of the prior art attempts to solve such problems, the subject invention constitutes a solution to such problems by providing an improved reformer furnace for the conversion of hydrocarbons with steam, generally in the presence of catalyst, into carbon oxides and hydrogen. The reactions taking place in the reformer furnace follow the reaction scheme of methane as exemplified by:

$$CH_4 + H_2O \rightarrow CO + 3H_2 \quad (1)$$

$$CO + H_2 \rightarrow CO_2 + H_2 \quad (2)$$

The overall reaction is highly endothermic and requires considerable heat, 1400°–1600° F., making the use of specialized apparatus within the furnace firebox necessary. Essentially the furnace comprises inlet and outlet headers, a plurality of vertical tubes wherein the actual reactions take place, connections of said tubes and said headers designed to accomodate the differential thermal expansion, which is characteristic of such high temperature furnaces, and a cast-in-place refractory seal at the juncture of the vertical tubes and the floor of the furnace directly above the connection of such vertical tubes to the horizontal outlet headers. The refractory seal is cast around said tubes after they are wrapped with ceramic fiber blanket material. Such blankets are also used to isolate the furnace floor outlet surfaces from the cast refractory seal. However, the refractory seal is cast onto the top surface of sliding steel base plates placed next to each of the vertical tubes at the furnace floor outlet without the use of a ceramic fiber layer. The refractory seal also rests on a carbon steel strip which partially closes off the opening formed by the sliding steel base plates. The refractory seal is rigidly affixed to said support strips and the base plates by V-shaped welding studs.

The refractory seal, as specified above, provides the advantages of negligible air leakage around the furnace floor aperture, damping of lateral vibration of the tubes and easy conversion of existing furnaces to such a sealing arrangement. Additional advantages of the seal are: the thermal expansion of the seal assembly in the case of an internally refractory-lined outlet header as in U.S. Pat. No. 3,607,130 to Worley et al. closely matches that of the header to avoid imposing lateral deflections on the outlet connections between the tubes and header, reduced maintenance because of the ease of simply repouring castable refractory, tube replacement without seal replacement by merely removing the ceramic fiber blanket material between the refractory and the tubes, low cost due to use of carbon steel and refractory rather than the more conventional CrNi High alloy steel parts of the typical furnace seals, and ready availability of components because of its commonplace materials.

BRIEF DESCRIPTION OF THE DRAWINGS

The invention is illustrated in its preferred form in the drawings attached hereto as described below.

DESCRIPTION OF THE PREFERRED EMBODIMENT

Figure 1:
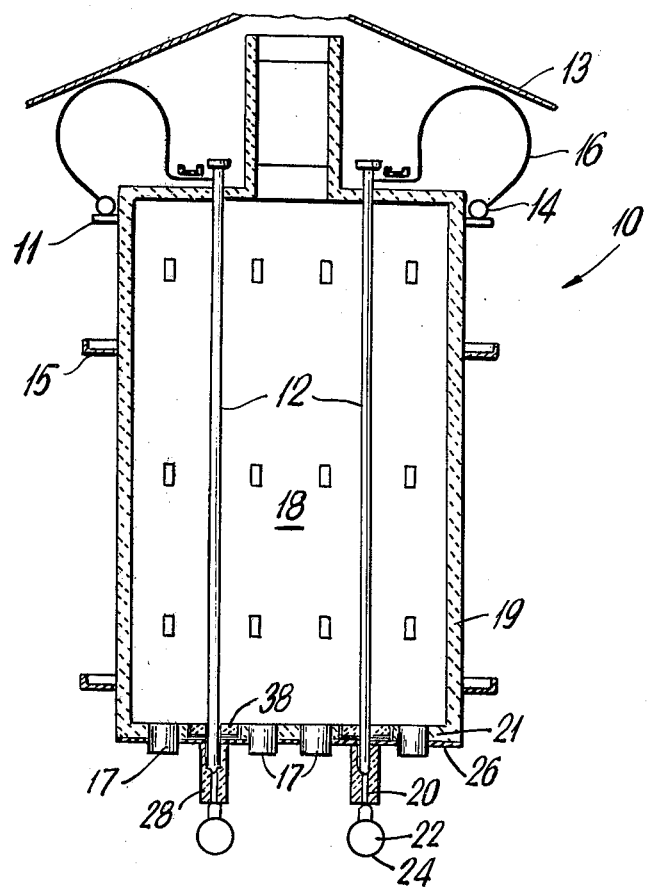
FIG. 1 is a sectional view of a reformer furnace typical of the subject invention.

Referring to the drawings wherein the same numerals will identify identical parts, in FIG. 1, the furnace 10 consists of a housing in which an array of vertical tubes 12 are contained. The tubes are generally arranged in rows, each tube being parallel to the next adjacent tube. A catalyst is provided in each tube 12 wherein the reforming reaction occurs. The tubes can be suspended from a structural beam with an elastic member or spring, such as in U.S. Pat. No. 3,607,130, or by other conventional means not inconsistent with the necessary movement of tubes 12 due to heating.

The tubes are connected at their upper ends to an inlet header 14. The inlet header is generally aligned in a horizontal position on supports 11. The connection of the inlet header 14 to the vertical tubes 12 is completed by small, flexible inlet connection tubes 16 in a loop (as shown) or helical configuration. The input to the reformer furnace flows along the inlet headers 14 and comprises a mixture of preheated gases, steam and hydrocarbons, at approximately 900° F. The inlet header can be lined with refractory in light of the temperatures which will be sustained in the header during input or gas feed periods.

Input gases flow down through vertical tubes 12 and contact the contained catalyst in said tubes. Reforming or chemical conversion of the gases in accordance with the above mentioned reactions then takes place in the heated portions of the vertical tubes. The tubes are heated along the greater extent of their length as they pass through the firebox 18 of the furnace 10. The firebox 18 is referred to as the radiant zone and the tubes 12 as fired tubes. The heat of the radiant zone or firebox 18 is supplied by conventional means, such as gas burners located in burner rows 17 in the furnace floor 21.

The furnace can be of conventional design, with refractory walls 19 and floor 21 resting on a steel floor plate 26. The floor plate is spaced above the ground level to provide access for the outlet headers 22 which can be refractory lined 24. A roof structure 13 covers the structure from the weather.

Reformed gases or product gases, consisting of hydrogen and carbon oxides, exit the lower portion of the vertical tubes 12 by small, tubular outlet connections 20 which deliver the gases to the outlet header 22. The gases emanating from said header 22 are processed for waste heat and are then used as reducing gas. The lower portion of the tubes 12, as well as the outlet connection 20, are insulated to conserve heat energy by covering said areas with insulation 28.

Figure 2:
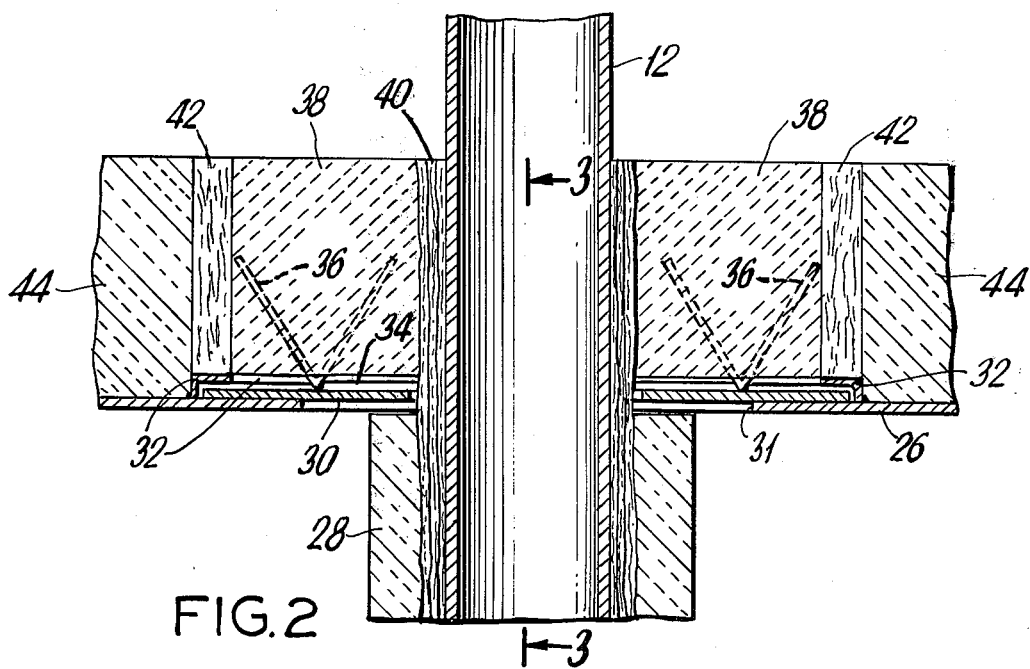
FIG. 2 is a partial sectional view on an enlarged scale of the lower portion of one vertical tube and its refractory seal.

As shown in FIG. 2, a detail of the outlet of the vertical tubes 12 through the furnace floor 21 is illustrated. The structure of this outlet provides for improved sealing of the tubes and furnace. The tubes exit the floor of the furnace through an outlet 31 through furnace floor plate 26. Sliding carbon steel base plates 30 are positioned above the outlet 31 to partially close off said outlet, yet provide sufficient room for the movement of the vertical tubes without contact of a rigid surface. The base plates 30 are held with the assistance of "L" shaped retaining clips 32 welded to the upper surface of the furnace floor plate adjacent the outlet 31. Carbon steel support strips 34 are inserted between adjacent vertical pipes in each row of said pipes, and directly on top of the base plates 30.

Prior to sealing the remaining space around the exit point of the tubes, ceramic fiber blankets 40 are wrapped around the exterior of said tubes from a point level with the upper surface of the refractory lining 44 of the furnace floor 21 and extending through the furnace floor beyond the upper coverage of the external insulation 28. Preferably, three layers of such blankets are used. The ceramic fiber blanket material can be chosen from such commercially available products as KAOWOOL. Additional packing of the ceramic fiber blankets 42 is used between the furnace floor insulation 44 and the area where cast refractory seal 38 will be placed.

Welding studs 36 are welded to the upper surface of the sliding steel base plate 30. The studs have a general "V" shaped configuration. These studs are used to assist in anchoring the refractory seal 38 to the base plate. With the ceramic fiber blankets in place, along with the appropriate welding studs, the furnace outlet 31 is ready for the refractory seal after any gap between plates 30 is temporarily closed by wood strips, etc., to prevent the refracting from leaking out when poured into the seal cavity. The castable refractory material is poured around each of the tubes 12 and fills the entire void defined by the furnace floor outlet. The cast refractory seal 38 moves as a unit with the tubes 12 and the base plate 30 because of the integral structure provided by the welding studs 36.

In order to insure that thermal expansion of the refractory seal 38 is kept symmetrical about the furnace center line, the sliding base plate 30 is fixed or held at the furnace center line. This insures that a symmetrical expansion about said center line is achieved. The refractory seal expansion and the direction of the movement matches that of the refractory lined outlet header below the furnace, which is also fixed or held at the center line of the furnace to insure controlled thermal expansion of the header.

The cast-in-place refractory seal 38 can be chosen from any of a wide variety of materials as long as these desirable properties are retained: maximum temperature at least 200° F. above maximum furnace interim, high mechanical strength at room temperature and operating temperature, low coefficient of expansion, low thermal conductance, and resistance to disintegration due to rapid temperature fluctuations. The refractory chosen may not exhibit all of these properties, but should contain most of them. High content $Al_2O_3$ refractories are preferred.

The design of the cast-in place refractory seal is particularly advantageous for the removal of individual tubes from the array of tubes. Tubes must periodically be replaced for mechanical degradation during the course of the operation of the reforming furnace. Individual tubes are selectively removed by simply unpacking the ceramic fiber blanket wrapped about each tube and then removal of the tube from the resultant enlarged opening in the refractory seal. There is no need to remove or destroy the refractory material, because the blankets of ceramic material provide sufficient tolerance for tube removal without disturbing said seal. This significantly reduces down time for maintenance of the tubes of the reformer furnace. The ceramic fiber material is replaced by packing the void between the replaced tube and the refractory seal casting.

In the event that mechanical degradation of the refractory seal occurs, such as breakage, cracking or other destruction, the refractory material can be restored or replaced by merely repouring additional castable refractory at the damaged area without the necessity of removal of all of the previously cast refractory seal. Of course, how much of the seal that remains and how much is removed prior to repair is dependent on the condition of the remaining refractory and its ability to provide a sealing function. But the ease of repairing refractory provides a simple, fast method for maintaining the cast-in-place refractory seal without excessive down time of the furnace.

When the cast refractory seal of this invention is used in conjunction with reduced diameter inlet and outlet connections 16,20 for the vertical tubes, the tubes can be easily disconnected from the headers 14 and 22 for repair by pinching off said connections. This prevents the flow of reaction gases or exhaust gases out of the headers during operation, while at the same time it allows an individual tube to be replaced or left inactive until an appropriate number of other tubes are also in need of repair. At that time the ease of tube removal from the refractory seal can be utilized to provide time efficient repairs.

Figure 3:
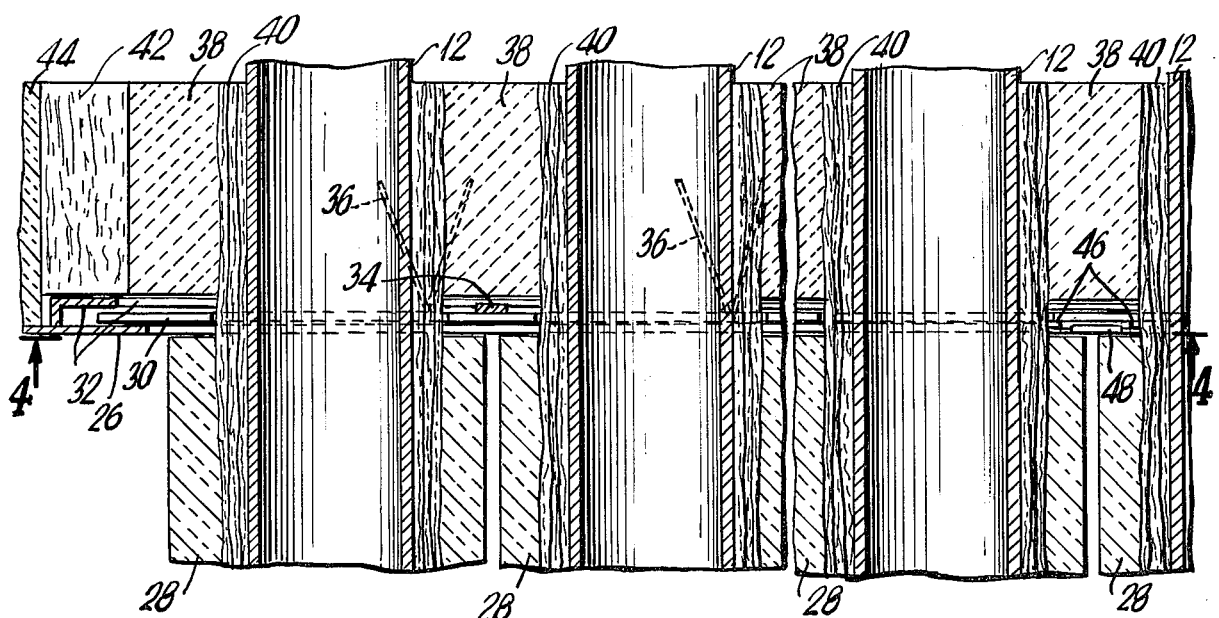
FIG. 3 is a partial broken sectional view of the vertical tubes and refractory seals taken along the line 3—3 of FIG. 2.

In FIG. 3, a cross-sectional view of the refractory seal in the subject reformer furnace is shown which is transverse to that view shown in FIG. 2. This view shows that the cast refractory material is placed completely around the tubes 12 and fills the spaces between such tubes so as to isolate one from the other.

The sliding steel base plates 30 are affixed in the furnace floor 21 by end retaining clips 32, as well as the clips shown in FIG. 2. The structure of the carbon steel support strip 34 is shown in its cross-sectional configuration between one or more of the vertical reformer tubes 12. The placement of additional "V" shaped welding studs 36 about the outlet 31 to insure integrity of the cast refractory seal 38 and the base plate 30 is also demonstrated in this view.

Figure 4:
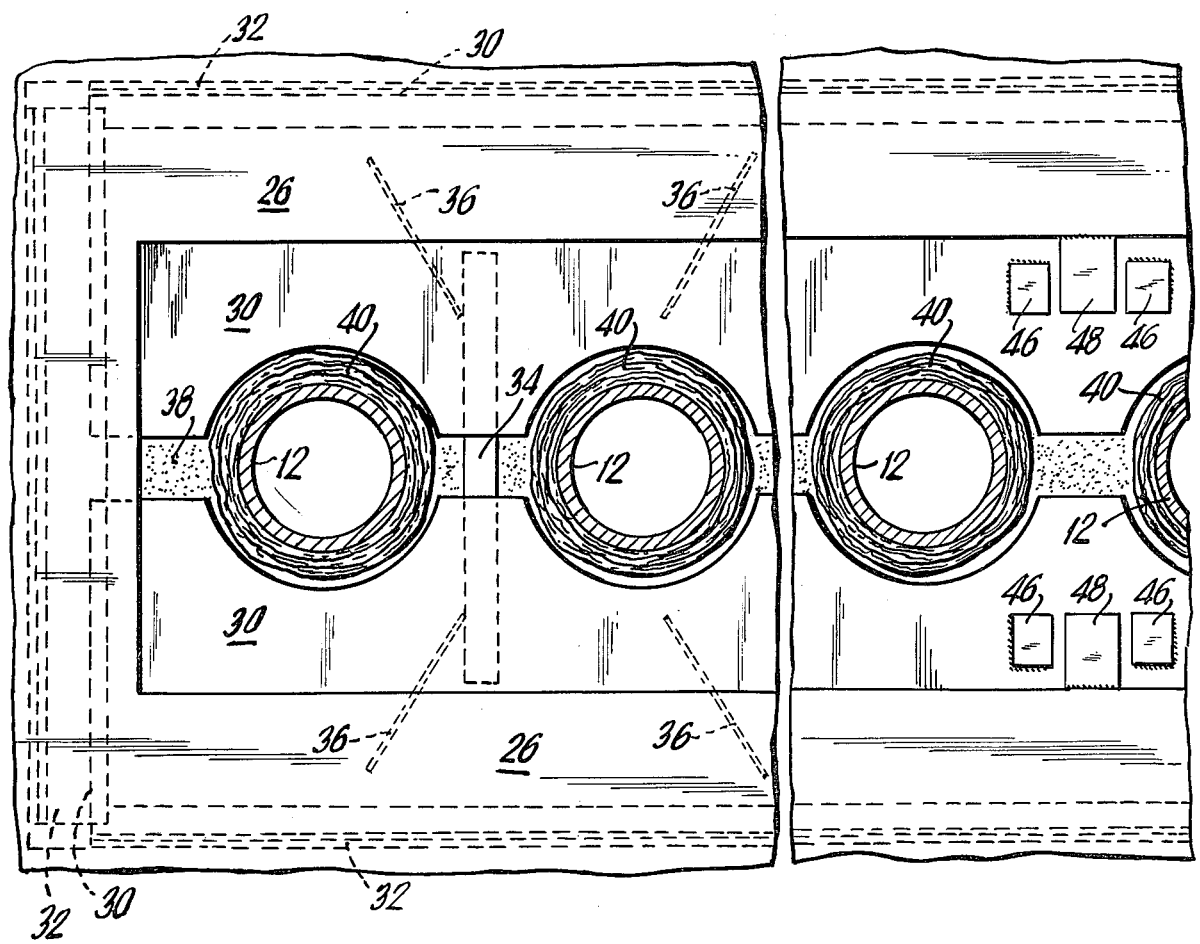
FIG. 4 is a partial broken sectional view of the vertical tubes of the invention taken along the line 4—4 of FIG. 3.

As shown in FIG. 4, which is a bottom plan view, the sliding steel base plates 30 are centered with respect to the furnace floor plate 26. This centering is maintained by interlocking anchor tabs 46 and 48. Anchor tabs 46 which are welded to the base plates 30 engage between anchor tabs 48 which are welded to the metal furnace floor plate 26.

The wraps of ceramic fiber blankets 40 are shown as concentric layers about the exterior of the vertical tubes 12. Such tubes are shown only to the extent of the portion of one row of the array of tubes. The entire furnace contains many identical tubes 12 and there can be several parallel rows of same as more fully depicted in FIG. 1.

The tubes 12 in the reformer furnace are generally cast alloy steel 25/20 Cr-Ni, such as HK40. The tubes range in size from an outside diameter of 2½" to 6" with a preferred dimension of 5" and a length of 30 to 40 feet. The thickness can be from ⅜" to 1". The tubes contain a catalyst material in their bore. A nickel catalyst, optionally with an alumina support, is used, although any suitable catalyst for the reforming reactions set forth above can be used. The catalyst may be modified with 15 to 25 weight percent of calcium or magnesium oxide. The particle size of the catalyst is in the range of ¼" to ½" spheres or pellets.

The refractory seals 38 are designed to have thermal growth approximating that of the tubes and other adjacent hardware of the furnace. This reduces stress or deflections usually associated with high-temperature operations. In order to further reduce the effects of thermal growth, the inlet connection 16, from the inlet header 14 to the upper end of a tube 12, is designed to absorb significant axial differential expansions of the tubes and inlet header. This is provided by the use of gradual loops or bends in the connector and the use of flexible stock material from which the connection tube is fabricated, such as carbon steel, carbon moly or low chrome steel of 1–2.5 inch diameter and 0.1 to 0.25 inch thickness.

The outlet connections 20 do not support the tubes which are individually suggested through springs, but do contribute to upward axial thermal growth of the tubes. The outlet connection 20 is an inflexible metal tube due to the fact that it is exposed to little or no axial thermal expansion of the lined outlet header. This is the result of the nearly matched thermal expansion of the refractory outlet tube seal. The tube can be made from a high nickel/chrome wrought alloy such as Incaloy 800 or 18/8 Cr-Ni Type 316 and is 1–2.5 inches in diameter with a thickness from 0.18 to 0.5 inches and a length of 1 to 3 feet.

The steam reforming reaction involved in this invention is well known and is generally described in such patents as U.S. Pat. No. 2,537,708, U.S. Pat. Nos. 3,132,010 and 3,607,130, the process description being hereby incorporated herein by reference. Essentially, however, the reaction is effected by passing steam and a suitable hydrocarbon, e.g., methane, ethane, propane, butane, naphtha, natural gas, liquefied petroleum gas, etc., into tubes disposed in a furnace, the tube outlet temperature ranging from about 1350°–1700° F., preferably 1400°–1500° F., e.g., 1450° F., and operating pressures ranging from about 14–500 p.s.i.g. Carbon dioxide may be added to the feed when $H_2/CO$ mixtures of definite ratios are desired. The mole ratio of steam and-/or carbon dioxide to methane equivalent is not critical and may range from about 1 to 3, suitably 2.1 to 2.6. When using steam alone, carbon monoxide reversion (to carbon dioxide and carbon) can be prevented at mole ratios above about 1.8. Space velocities can also vary widely, i.e., from about 700 volumes of methane equivalent per hour per volume of catalyst to about 1000 to 2000 volumes of methane equivalent per hour per volume of catalyst.

Having now described the invention, various modifications and variations of which will be obvious to those skilled in the art, the following claims are herewith appended.

What is claimed is:

1. In a hydrocarbon reforming furnace having a furnace box, a plurality of vertically oriented reforming tubes with their inlet and outlet ends extending outside said furnace box, a horizontally oriented inlet header provided with insulation on the interior thereof, a horizontally oriented outlet header provided with insulation on the interior thereof, the improvement comprising a refractory seal cast in place about the lower portion of the vertically oriented reforming tubes wherein such refractory seal is supported on metal support strips and sliding metal base plates with "V" shaped welding studs securing said refractory seal to said sliding metal base plates whereby said refractory seal which has a different coefficient of expansion than said base plates can nonetheless move therewith and the interface of the cast-in-place refractory seal with the tubes and the furnace floor is additionally sealed with ceramic fiber blankets so as to further increase the air sealing of the refractory seal and the tube vibration dampening function of said refractory seal, said refractory seal having a thermal expansion rate similar to that of the insulated outlet header.

* * * * *